United States Patent
Swartz (10) Patent No.: US 9,294,506 B2
(45) Date of Patent: Mar. 22, 2016

(54) METHOD AND APPARATUS FOR SECURITY ENCAPSULATING IP DATAGRAMS

(75) Inventor: Troy Swartz, Chapel Hill, NC (US)

(73) Assignee: Certes Networks, Inc., Pittsburgh, PA (US)

( * ) Notice: Subject to any disclaimer, the term of this patent is extended or adjusted under 35 U.S.C. 154(b) by 516 days.

(21) Appl. No.: 13/109,201

(22) Filed: May 17, 2011

(65) Prior Publication Data

US 2011/0314274 A1 Dec. 22, 2011

Related U.S. Application Data

(60) Provisional application No. 61/345,276, filed on May 17, 2010.

(51) Int. Cl.
H04L 29/06 (2006.01)

(52) U.S. Cl.
CPC .......... *H04L 63/164* (2013.01); *H04L 63/0428* (2013.01); *H04L 63/123* (2013.01)

(58) Field of Classification Search
USPC ................. 726/13–15; 713/160–161
See application file for complete search history.

(56) References Cited

U.S. PATENT DOCUMENTS

| | | | | |
|---|---|---|---|---|
| 6,795,917 B1* | 9/2004 | Ylonen | ................... | H04L 29/06 713/160 |
| 7,188,250 B1* | 3/2007 | Alfieri | ................... | H04L 9/3236 713/161 |
| 2003/0123481 A1* | 7/2003 | Neale | ................. | H04B 7/18582 370/466 |
| 2003/0188159 A1* | 10/2003 | Josset | ................. | H04L 63/0428 713/163 |
| 2004/0034695 A1* | 2/2004 | Touch | ............... | H04L 29/12283 709/209 |
| 2004/0215955 A1* | 10/2004 | Tamai | ................. | H04L 63/0428 713/150 |
| 2006/0190720 A1* | 8/2006 | Ozaki | ................. | H04L 63/0428 713/160 |
| 2008/0301798 A1* | 12/2008 | Hao | .................... | H04L 12/2602 726/13 |
| 2009/0022152 A1* | 1/2009 | Henry | ................. | H04L 29/1233 370/389 |

OTHER PUBLICATIONS

Xilouris et al., "Unidirectional lightweight encapsulation: performance evaluation and application perspectives," Year: 2006, vol. 52, Issue: 3 pp. 374-380.*

Epstein, Steve "Using multi-protocol encapsulation technology to develop optimum data broadcast systems," Eutelsat—New Products and Services (Ref. No. 2000/030), IEE Colloquium on Year: 2000 pp. 1/1-1/7.*

* cited by examiner

*Primary Examiner* — Roderick Tolentino
(74) *Attorney, Agent, or Firm* — Hamilton, Brook, Smith & Reynolds, P.C.

(57) ABSTRACT

A method and corresponding apparatus are provided to security encapsulate an original IP datagram received from a network. It is first determined whether an IP payload of the original IP datagram is a TCP segment, UDP datagram or packet of another type of network protocol. Based on this determination, a portion of the IP payload is encrypted resulting in an encrypted payload. A security encapsulated IP packet is then formed with source IP address, destination IP address, and IP protocol field from the original IP datagram, and the encrypted payload. The security encapsulated IP packet is then provided to the network.

17 Claims, 7 Drawing Sheets

METHOD AND APPARATUS FOR SECURITY ENCAPSULATING IP DATAGRAMS

RELATED APPLICATION

This application claims the benefit of U.S. Provisional Application No. 61/345,276, filed on May 17, 2010. The entire teachings of the above application are incorporated herein by reference.

BACKGROUND OF THE INVENTION

Data transferred over many communication networks are typically sent unsecured, without the benefit of encryption and/or strong authentication of the sender. Sending unsecured data on a communication network may make the data vulnerable to being intercepted, inspected, modified and/or redirected. To make data less prone to these vulnerabilities, many networks employ various security standards and protocols to secure network traffic transferred in their networks. This secured network traffic is typically transferred using data packets that are encoded according to a security standard and/or protocol. As used herein, a secured data packet is a data packet that has been secured using a security standard and/or protocol. Likewise, as used herein, an unsecured data packet is a data packet that has not been secured using a security standard and/or protocol.

One well-known widely-used standard for securing Internet Protocol (IP) traffic is the IP security (IPsec) standard. The IPsec standard comprises a collection of protocols that may be used to transfer secure data packets end-to-end between a pair of hosts (host-to-host), between a pair of security gateways (network-to-network), or between a security gateway and a host (network-to-host). IPsec operates at layer-3 (L3), which is the network layer of the Open Systems Interconnection Reference Model (OSI-RM). A description of IPsec may be found in Request for Comments (RFC) 2401 through RFC 2412 and RFC 4301 through RFC 4309, all of which are available from the Internet Engineering Task Force (IETF). One protocol that is commonly used to encapsulate an IP datagram is the Encapsulating Security Payload (ESP) protocol.

The ESP protocol provides a means to authenticate and verify the integrity of IP traffic carried in a secured packet. In addition, the ESP protocol provides a means to encrypt the IP traffic to prevent unauthorized interception of the IP traffic. The ESP uses an Integrity Check Value (ICV) to authenticate and check the integrity of a packet. Encryption is used to ensure confidentiality of the IP traffic. Encryption is accomplished by applying an encryption algorithm to the IP traffic to encrypt it. Encryption algorithms commonly used with IPsec include Data Encryption Standard (DES), triple-DES and Advanced Encryption Standard (AES).

SUMMARY OF THE INVENTION

The standard technique for securing IP traffic is to apply IPSec ESP security encapsulation to an IP datagram or packet. Several problems can arise when adding IPSec security to an existing Transmission Control Protocol (TCP) over IP or TCP/IP network (and/or User Datagram Protocol (UDP) over IP or UDP/IP network) and sending IPSec security encapsulated packets through an existing TCP/IP (and/or UDP/IP) network. These problems occur when routers, network traffic analyzers or other network equipment that make up the existing TCP/IP (and/or UDP/IP) network need access to information in the IP packets to determine how the packets should be processed or to maintain flow statistics based on the network's traffic flows. Each of these traffic flows may be identified by a packet's source IP address, destination IP address, IP protocol, and source and destination ports.

One problem, for example, is when differentiated services (DiffServ) is used by the routers in the network to provide Quality of Service (QoS) for the network traffic. The network equipment implementing DiffServ may use a multifield (MF) classifier to differentiate the network traffic based on source and destination IP addresses of the traffic and traffic type. The traffic type is determined by the IP protocol and the TCP/UDP source and destination port values. When IPSec ESP encapsulation is applied to the IP packets, the IP protocol and TCP/UDP port values are encrypted and the routers are unable to implement the correct QoS for the traffic.

Another problem occurs when NetFlow statistics are gathered on the traffic in the network. Network statistics are maintained based on the traffic flows, which are identified by the source and destination IP addresses, and the protocol and port values in the IP packets. A service provider is unable to gather accurate statistics if IPSec is used to implement security for the network because the protocol and port information in the packets are not available to the statistical routines.

Because IPsec is an end-to-end security scheme for host-to-host, network-to-network, and network-to-host secure data transfers, the scheme does not contemplate points (or devices) that do not participate in IPsec between end points. For example, IPsec requires "internal" devices to have the capability to decrypt IPsec packets.

To solve some of these problems, example embodiments of the present invention may be implemented in the form of a method or corresponding apparatus for security encapsulating an original IP datagram received from a network. A method and corresponding apparatus of an example embodiment includes a network security device. The device determines whether an IP payload of the original IP datagram consists of a TCP segment, UDP datagram or packet of another type of network protocol, also referred to as a "non-TCP/UDP packet." Based on this determination, the device encrypts a portion of the IP payload. This results in an encrypted payload. The device then forms a security encapsulated IP packet with source IP address, destination IP address, and protocol IP field from the original IP datagram, and the encrypted payload. The device then provides the security encapsulated IP packet to the network.

According to other embodiments, the device encrypts a different portion of the IP payload depending on whether the IP payload of the original IP datagram is a TCP segment, UDP datagram or packet of another type of network protocol (non-TCP/UDP packet).

When the IP payload is a TCP segment or UDP datagram, the device of one embodiment encrypts a payload of the TCP segment or UDP datagram. The resulting encrypted TCP or UDP payload is the encrypted payload of the security encapsulated IP packet. The device passes a header of the TCP segment or UDP datagram without encrypting the header. The header being passed is referred to as a non-encrypted header. The device then forms the security encapsulated IP packet from the non-encrypted header, together with the source IP address, destination IP address, and IP protocol field from the original IP datagram, and the encrypted payload.

When the payload of the IP datagram contains another network protocol, other than TCP or UDP, the device of another embodiment encrypts the entire IP payload. The resulting encrypted IP payload is the encrypted payload of the security encapsulated IP packet.

In one embodiment, whether the IP payload of the original IP datagram is a TCP segment, UDP datagram or packet of another type of network protocol (non-TCP/UDP packet) is determined from an IP protocol field within an IP header of the original IP datagram.

In another embodiment, a portion of the IP payload is encrypted using Advanced Encryption Standard (AES) encryption.

In yet another embodiment, encrypting the payload of a TCP segment or UDP datagram involves computing an initialization vector and then encrypting the computed vector together with a portion of the IP payload. The resulting encrypted initialization vector and portion of the IP payload is the encrypted payload of the security encapsulated IP packet.

According to other embodiments, security information may be added or otherwise appended to the security encapsulated IP packet. In one embodiment, a security parameters index value and sequence number are added to the packet. In another embodiment, an integrity check value (ICV) is computed from the encrypted payload and then appended to the security encapsulated IP packet. In a convenient embodiment, the ICV is calculated using a Hash-based Message Authentication Code using Security Hash Algorithm 1 (HMAC-SHA-1).

In another embodiment, a TCP/UDP checksum value is computed for the encrypted payload. The computed value replaces the TCP/UDP checksum value of the TCP segment or UDP datagram.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
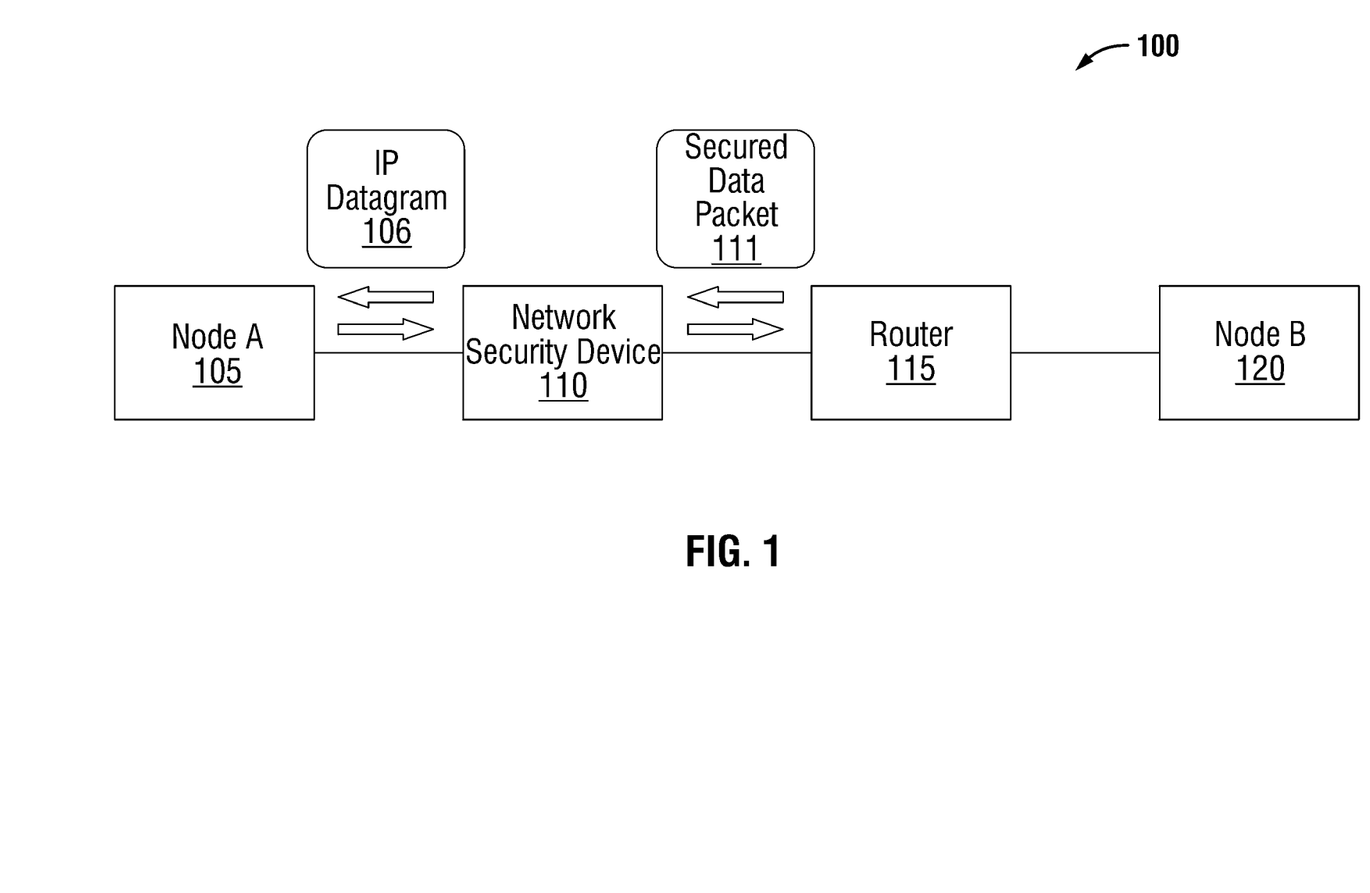
FIG. 1 is a network diagram of an example network in which embodiments of the present invention may be deployed.

FIG. 1 shows an example network 100 in which embodiments of the present invention may be deployed. In the network 100, Node A 105, network security device 110, router 115, and Node B 120 are internetworked. Node A 105 sends an IP datagram 106 to the network security device 110. The IP datagram 106 is destined for Node B 120. The network security device 110 security encapsulates or applies security encapsulation to the IP datagram 106 resulting in a security encapsulated packet (or secured data packet) 111. FIG. 1 also shows the network security device 110 security decapsulating the secured data packet 111 resulting in the IP datagram 106.

Described below in greater detail, a standard security encapsulation technique renders some of the information from the original IP datagram 106, now security encapsulated in the security encapsulated packet 111, inaccessible or otherwise unavailable. For example, the technique encrypts the information. The router 115, however, is configured to route or classify IP datagrams based on this information. Without this information or being able to access this information (e.g., by decrypting the information), the router 115 cannot properly deliver the security encapsulated packet 111 to Node B 120. Consequently, Node B 120 cannot receive, the security encapsulated packet 111 (and the original IP datagram 106) because of the applied security encapsulation.

Figure 2:
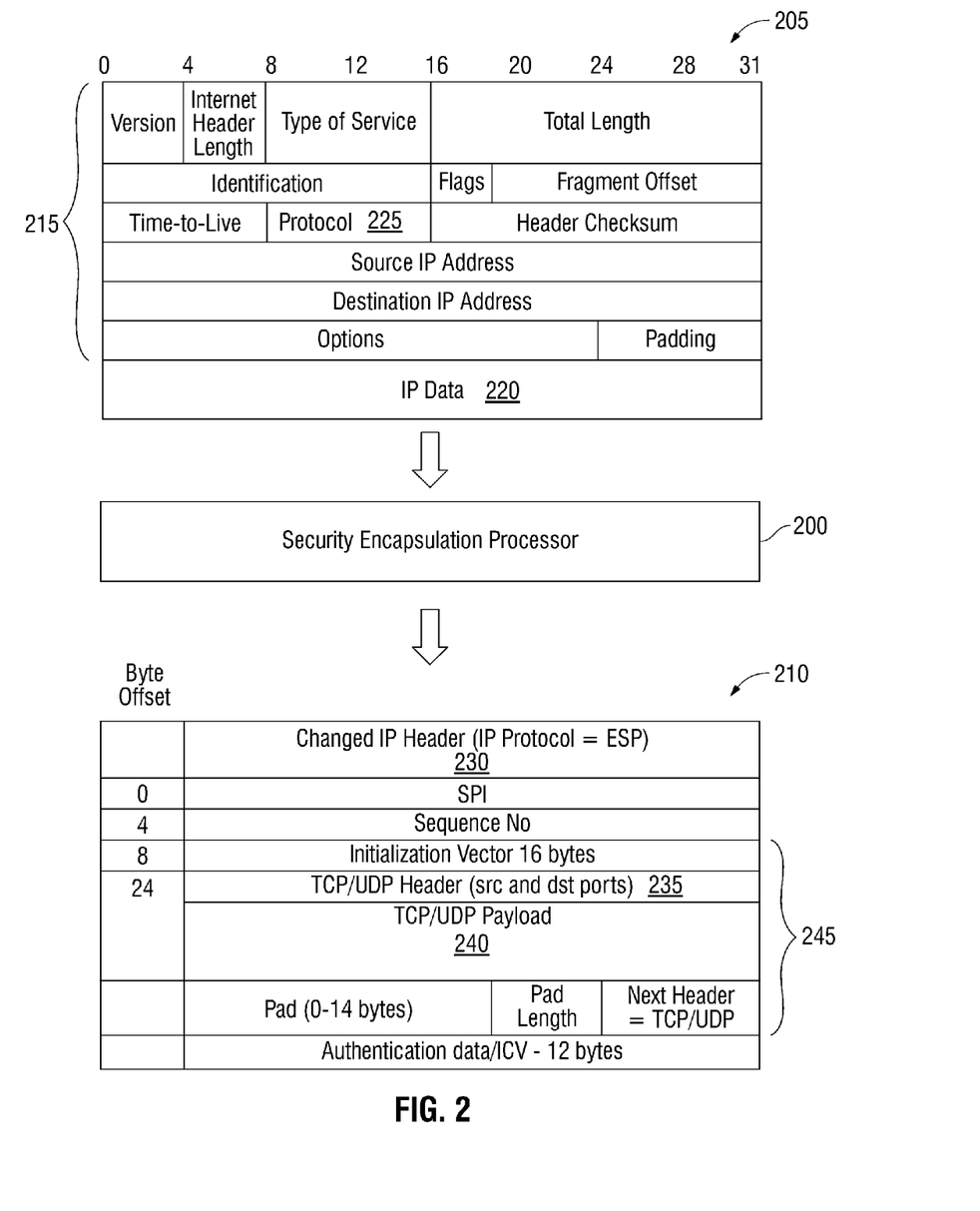
FIG. 2 is a block diagram of an IP datagram that is security encapsulated in a typically ESP manner.

FIG. 2 shows a security encapsulation processor 200 (e.g., a processor in the network security device 110 of FIG. 1) applying standard IPSec ESP encapsulation to an IP datagram 205. The result is an ESP packet 210. The IP datagram 205 has an IP header 215 and payload (or data) 220. The IP header 215 has an IP protocol field 225. The IP protocol field 225 indicates the next higher layer protocol being carried as the IP payload 220.

For example, the IP protocol field 225 having an IP protocol type code or value of six indicates that the IP payload 220 is a TCP segment. The TCP segment includes a TCP header and TCP payload. The TCP header includes source and destination port values. Another example, the IP protocol field 225 having an IP protocol type value of seventeen indicates that the IP payload 220 is a UDP datagram. The UDP datagram includes a UDP header and UDP payload. The UDP header includes source and destination port values.

In a typical ESP encapsulation manner, the processor 200 changes the value of the IP protocol field 225 to fifty indicating ESP encapsulation. This is shown in the ESP packet 210 as a changed IP header 230. The processor 200 encrypts the IP payload 220. In more detail, and in the case of a TCP segment or UDP datagram as the IP payload 220, the processor 200 encrypts the header (with source and destination port values) and payload of the TCP segment or UDP datagram. The result is an encrypted TCP/UDP header 235 (with encrypted source and destination port values) and encrypted TCP/UDP payload 240. The encrypted TCP/UDP header 235 and encrypted TCP/UDP payload 240 are part of an encrypted portion 245 of the ESP packet 210 (shown in the FIG. 2 as being shaded).

Because of security encapsulation, the IP protocol field 225 of the original IP datagram 205 and header of the TCP segment or UDP datagram carried in the original IP datagram 205 cannot be readily accessed. To access this information, a recipient of the ESP packet 210 applies standard IPSec ESP encapsulation in reverse, for example, by decrypting the encrypted TCP/UDP header 235 and changing back the IP protocol field 225 (in the changed IP header 230). Consequently, a router or other network device that needs access to this information (e.g., for the purpose of providing quality of service or maintaining statistics as described above) must first apply security encapsulation in reverse (i.e., security decapsulation). This, however, requires access to keying material used to encrypt and authenticate the secured packet data, which may not be available to these devices. Even if the keying material is available, the additional resources required to process the packets makes these devices more complicated and expensive.

Figure 3:
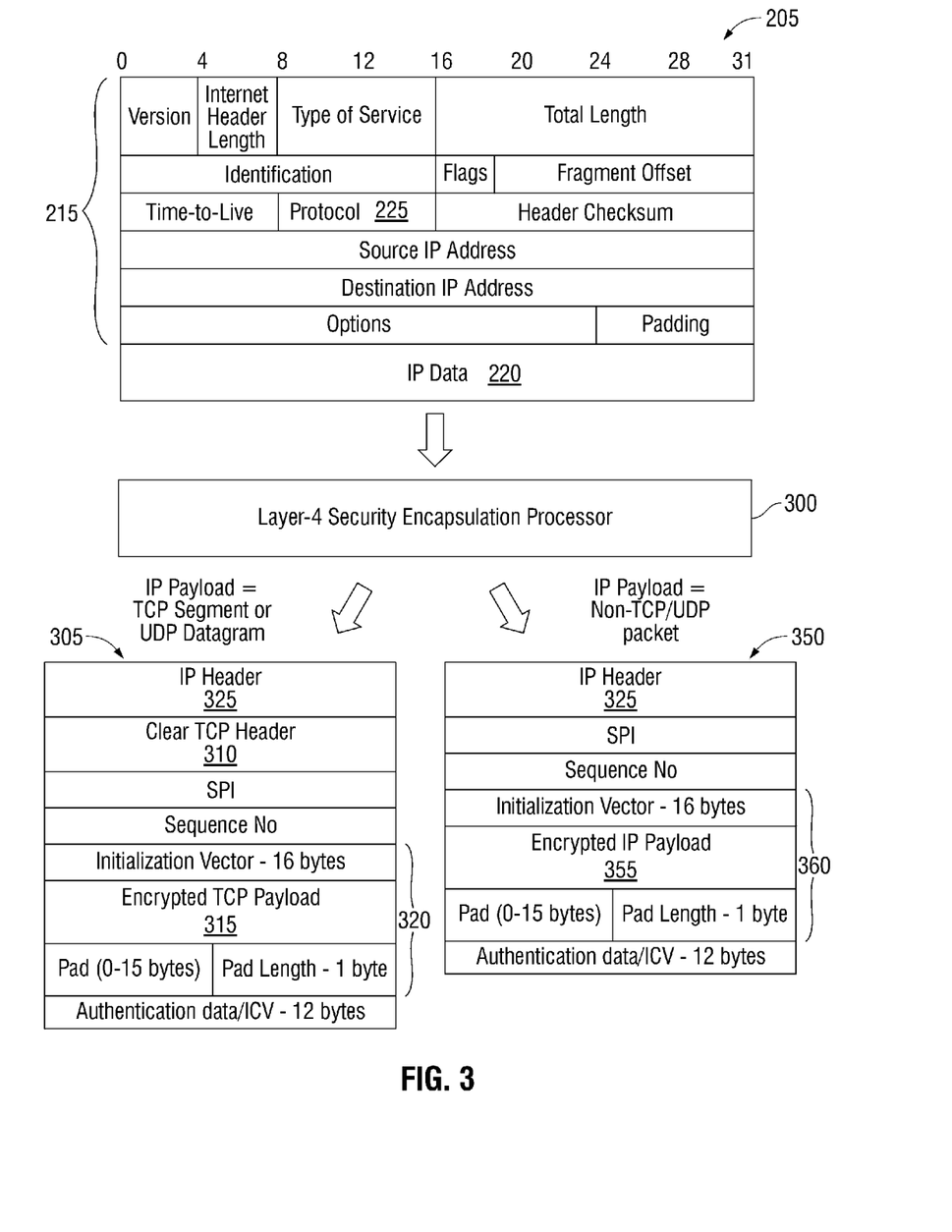
FIG. 3 is a block diagram of an IP datagram that is security encapsulated in accordance with example embodiments of the present invention.

FIG. 3 shows a layer-4 security encapsulation processor 300 (e.g., a processor in the network security device 110 of FIG. 1) applying security encapsulation to the original IP datagram 205 of FIG. 2 according to an example embodiment of the present invention. The result is a first encapsulated layer-4 security packet 305 or a second encapsulated layer-4 security packet 350 depending on whether an IP payload of the original IP datagram 205 is a TCP segment, UDP datagram or packet of another type of network protocol, also referred to as a non-TCP/UDP packet.

In more detail, the processor 300 determines whether the IP payload 220 of the original IP datagram 205 is a TCP segment, UDP datagram or non-TCP/UDP packet. According to a convenient embodiment, the processor 300 uses the IP protocol field 225 (within the IP header 215) to determine which protocol is the IP payload 220.

If the original IP datagram 205 has a TCP segment (or UDP datagram) as the IP payload 220 (e.g., IP protocol type value=six or IP protocol type value=seventeen), the processor 300 encrypts a portion of the IP payload 220 (i.e., a portion of TCP segment or UDP datagram) while leaving another portion unencrypted. The processor 300 encrypts the TCP (or UDP) payload portion of the TCP segment (or UDP datagram). The result is an encrypted TCP (or UDP) payload 315. The encrypted TCP (or UDP) payload 315 is part of an encrypted portion 320 of the packet 305.

The processor 300 does not encrypt the TCP (or UDP) header 310 of the TCP segment (or UDP datagram). This is shown in the packet 305 as a clear TCP (or UDP) header 310. The clear TCP (or UDP) header 310 includes source and destination port values. It may be said that the processor 300 passes the TCP (or UDP) header 310 in the "clear" and that the header 310 is not included in an encryption process.

The processor 300 then forms the first encapsulated layer-4 security packet 305 having an IP header 325 (with source and destination IP address, and IP protocol field from the original IP datagram 205), unencrypted TCP (or UDP) header 310, and encrypted TCP (or UDP) payload 315.

If the original IP datagram 205 has a non-TCP/UDP packet as its payload, the processor 300 encrypts the entire IP payload 220 (i.e., whole portion). The result is an encrypted IP payload 355. The IP payload 355 is part of an encrypted portion 360 of the second encapsulated layer-4 security packet 350. The processor 300 then forms the second encapsulated layer-4 security packet 350 having an IP header 325 (with source and destination IP address, and IP protocol field from the original IP datagram 205) and encrypted IP payload 355.

The processor 300 provides the first encapsulated layer-4 security packet 305 or second encapsulated layer-4 security packet 350 to a network, such as the network 100 of FIG. 1. Because the first and second encapsulated layer-4 security packets 305 and 350 are similar to IP packets (e.g., they are exchanged at layer-3 of a network like IP packets), they may also be called security encapsulated IP packets.

The processor 300 does not change the value of the IP protocol field 225 from the original IP datagram 205. The first and second encapsulated layer-4 security packets 305 and 350 each have the same the IP protocol field value in their respective IP headers as the original IP datagram 205. In contrast, in standard IPSec ESP encapsulation, an IP protocol field of an original IP datagram does change, as described above in reference to the changed IP header 230 of FIG. 2.

Various information about the original IP datagram 205 can be readily obtained from the encapsulated layer-4 security packets 305 and 350. For example, the source and destination IP address, and IP protocol field 225 (from the IP header 215 of the original IP datagram 205) can be readily obtained. From the encapsulated layer-4 security packets 305, the header of the TCP segment (or UDP datagram) carried inside of the original IP datagram 205 can be readily obtained. This information cannot be readily accessed from the ESP packet 210 of FIG. 2 because the information is changed and encrypted according to standard IPSec ESP encapsulation techniques.

A router or other network device that relies on IP header and/or TCP (or UDP) header information (e.g., for the purpose of providing quality of service or maintaining statistics as described above) can access this information from the encapsulated layer-4 security packets 305 and 350 without additional processing and/or resources. Indeed some devices treat the packets 305 and 350 no different from any other IP packet. Thus, security can be applied to the packet data without negatively impacting the flow of traffic through the network or requiring internal network equipment to have the capability to decrypt the packets.

FIG. 3 shows the encapsulated layer-4 security packets 305 and 350, outputted by the processor 300, having additional and/or optional information. For example, according to one embodiment, the encrypted portions 320 and 360 include an initialization vector that is encrypted during an encryption process and, subsequently, decrypted during a decryption process.

According to another embodiment, the output packets 305 and 350 include security information, such as a security packet index (SPI) value used to identify a security association of a sending party and a sequence number (Sequence No) used to protect against replay attacks.

According to yet another embodiment, an integrity check value (ICV) is computed and appended to (or added after) the encrypted portions or payloads 320 and 360 (i.e., added to the output packet 305). This enables a receiver (e.g., Node B 120 of FIG. 1) of the output packet 305 (or 350) to authenticate and check the integrity of the packet 305 (or 350).

According to still yet another embodiment, a TCP/UDP checksum is computed from the encrypted payload 315 (and in some cases, also from the previously described security information and ICV). The computed checksum replaces the original TCP/UDP checksum value found in the TCP (or UDP) header 310 of the output packet 305.

Figure 4:
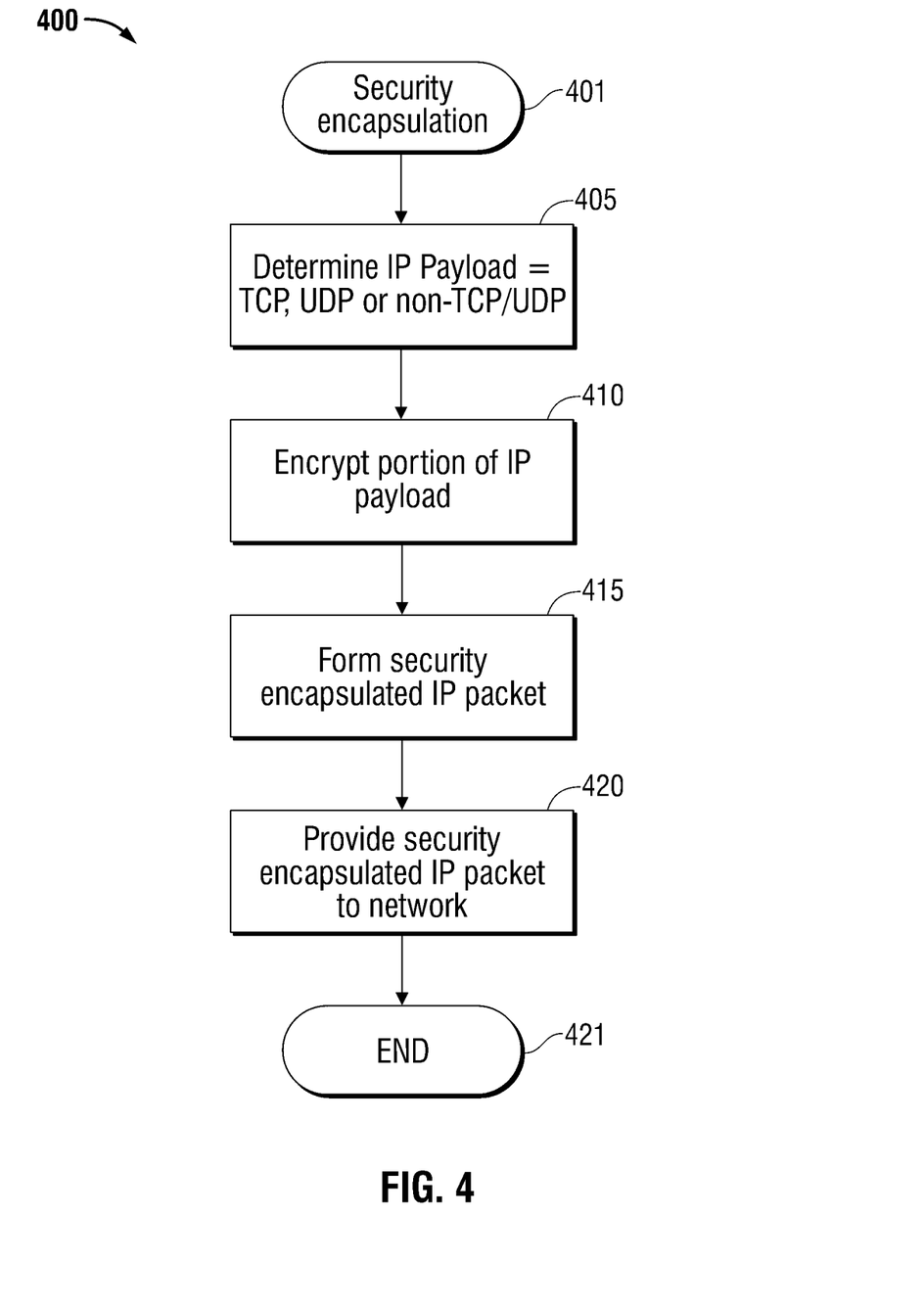
FIG. 4 is a flow chart of an example procedure for security encapsulating an IP datagram in accordance with an example embodiment of the present invention.

FIG. 4 shows an example procedure 400 for security encapsulating an original IP datagram received from a network, according to one embodiment. The procedure 400 may be performed by, for example, the layer-4 security encapsulation processor 300 of FIG. 3. The procedure 400 starts (401).

The procedure 400 determines (405) whether an IP payload of the original IP datagram is a TCP segment, UDP datagram or packet of another type of network protocol (non-TCP/UDP packet). According to one embodiment, the procedure 400 uses an IP protocol field within the IP header of the received IP datagram to determine if the IP payload is a TCP segment, UDP datagram or packet of another type of network protocol (non-TCP/UDP packet).

The procedure 400, based in the foregoing determination, then encrypts (410) a portion of the IP payload to form an encrypted payload of a security encapsulated IP packet. A different portion is encrypted for different types of IP payloads. When the IP payload is a TCP segment or UDP datagram, the procedure 400 encrypts (not shown) a payload of the TCP segment or UDP datagram but not a header of the TCP segment or UDP datagram. The resulting encrypted TCP or UDP payload is the encrypted payload of the security encapsulated IP packet. When the IP payload is a packet of another network protocol (non-TCP/UDP packet), the procedure 400 encrypts (not shown) the entire IP payload. The resulting encrypted IP payload is the encrypted payload of the security encapsulated IP packet.

In an example embodiment, the portion of the IP payload is encrypted using AES encryption. Other encryption algorithms are possible, such Data Encryption Standard (DES) and triple-DES. It should be readily apparent that the principles of the present invention are not intended to be limited to certain algorithm and extend to include other algorithms. In another embodiment, other information may be encrypted in addition to the portion of the IP payload, as described in reference to FIG. 3.

Continuing with FIG. 4, the procedure 400 forms (415) the security encapsulated IP packet with source IP address, destination IP address, and IP protocol field from the original IP datagram, and the encrypted payload. The encrypted payload of the security encapsulated IP packet may be different depending on whether the IP payload of the original IP datagram is a TCP segment, UDP datagram or packet of another type of network protocol (non-TCP/UDP packet), as described above. Further, when the IP payload is a TCP segment or UDP datagram, the procedure 400 forms the security encapsulated IP packet with a header of the TCP segment or UDP datagram, in the clear, together with the source IP address, destination IP address, and IP protocol field from the original IP datagram, and the encrypted payload.

The procedure 400 then provides (420) the security encapsulated IP packet to the network. The procedure 400 ends (421) having security encapsulated the original IP datagram into the security encapsulated IP packet and having provided this output IP packet to the network.

The procedure 400 does not change the IP protocol field in the IP header from the original IP datagram. The output IP packet provided by the procedure 400 has the same IP protocol field as the original IP datagram that was received from the network.

While FIG. 4 shows the procedure 400 ending at 421, the procedure may be a continuously running procedure. In such an embodiment, after the procedure 400 reaches and completes block 420 (i.e., a security encapsulated IP packet is provided), the procedure 400 returns to decision block 405 and waits to determine whether an IP payload of another IP datagram is a TCP segment, UDP datagram or non-TCP/UDP packet (packet of another type of network protocol).

Figure 5:
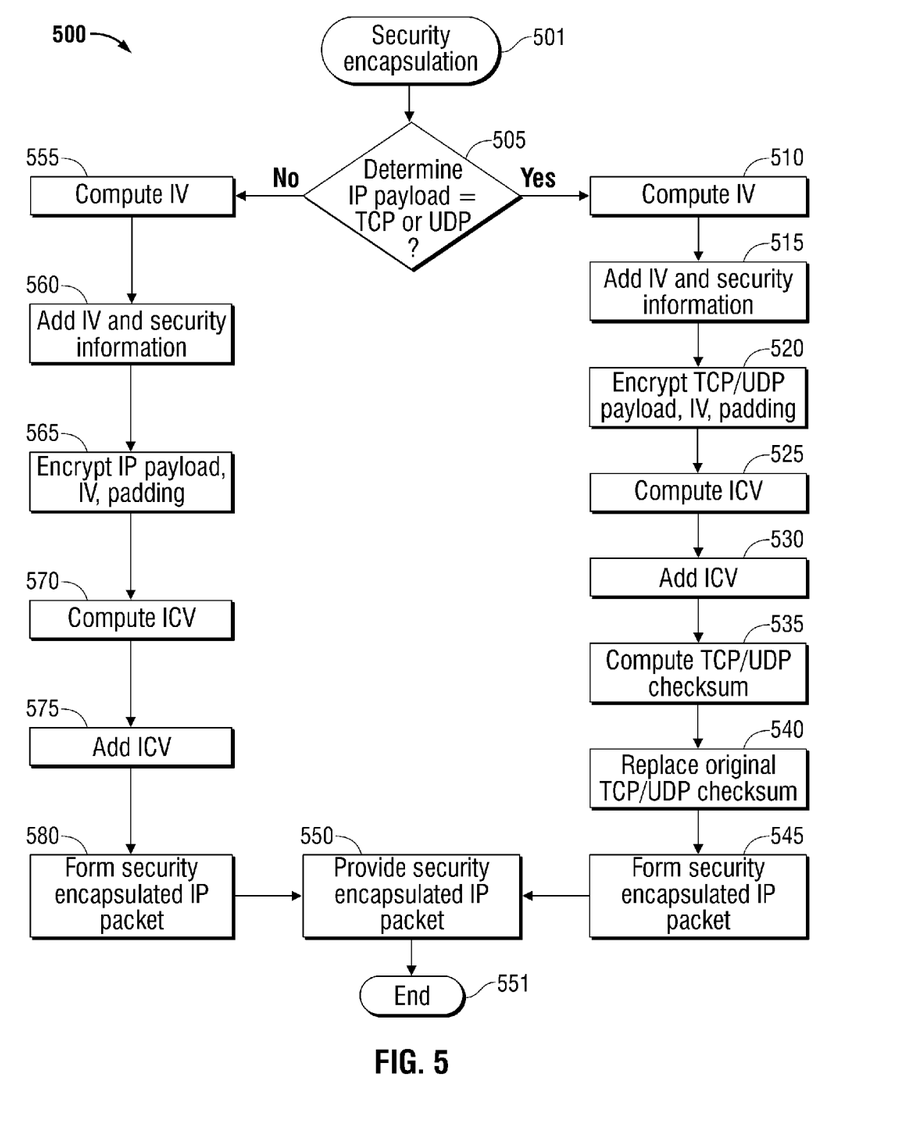
FIG. 5 is a flow chart of an example procedure for security encapsulating an IP datagram in accordance with several other embodiments of the present invention.

FIG. 5 shows an example procedure 500 for security encapsulating an original IP datagram received from a network. The received IP datagram having an IP header and IP payload, as described in reference to FIG. 2.

The procedure 500 starts (501). The procedure 500 determines (505) whether the IP payload of the original IP datagram is a TCP segment, UDP datagram or packet of another type of network protocol (non-TCP/UDP packet). The TCP segment having a TCP header and TCP payload. The UDP datagram having a UDP header and UDP payload.

If the procedure 500 determines (505) that the IP payload is a TCP segment (or UDP datagram), the procedure 500 computes (510) an initialization vector. The procedure 500 then adds (515) security information, along with the computed initialization vector after the TCP (or UDP) header.

The procedure 500 encrypts (520) the TCP (or UDP) payload, initialization vector, and padding to form an encrypted payload. The procedure 500 does not encrypt a header of the TCP segment or UDP datagram. The procedure 500 then computes (525) an integrity check value from the encrypted payload and security information (e.g., SPI and sequence number). The procedure 500 then adds (530) the value after the encrypted payload.

The procedure 500 computes (535) a TCP (or UDP) checksum from the security information, encrypted payload, and ICV. The procedure 500 then replaces (540) the original TCP (or UDP) checksum (found in the TCP (or UDP) header) with the computed TCP (or UDP) checksum.

The procedure 500 forms (545) a security encapsulated IP packet having an IP header (with the source and destination IP addresses, and IP protocol field from the original datagram), TCP (or UDP) header (with the newly computed TCP (or UDP) checksum), security information, encrypted payload (formed by encrypting the TCP (or UDP) payload, initialization vector, padding), and ICV. Diagrammatically, the security encapsulated IP packet may look like the first security encapsulated IP packet 305 shown in FIG. 3.

The procedure 500 then provides (550) the security encapsulated IP packet to the network. The procedure 500 ends (551) having security encapsulated the original IP datagram into the security encapsulated IP packet (with the encrypted payload of the TCP segment or UDP datagram) and having provided this output IP packet to the network.

Returning to decision block 505, if the procedure 500 determines (505) that the IP payload is a packet of another type of network protocol (non-TCP/UDP packet), the procedure 500 computes (555) an initialization vector. The procedure 500 then adds (560) security information, along with the computed initialization vector, after the IP header of the original IP datagram.

The procedure 500 then encrypts (565) the IP payload (carrying the non-TCP/UDP packet), initialization vector, and padding to form an encrypted payload. The procedure 500 then computes (570) an integrity check value (ICV) from the encrypted payload and security information (e.g., SPI and sequence number). The procedure 500 then adds (575) the computed ICV after the encrypted payload.

The procedure 500 forms (580) a security encapsulated IP packet having source and destination IP addresses, and IP protocol field from the original datagram, security information, encrypted payload (formed by encrypting the IP payload, initialization vector, and padding), and ICV.

The procedure 500 then provides (550) the security encapsulated IP packet (with encrypted IP payload) to the network. The procedure 500 ends (551) having security encapsulated the original IP datagram into the security encapsulated IP packet and having provided this output IP packet to the network.

Figure 6:
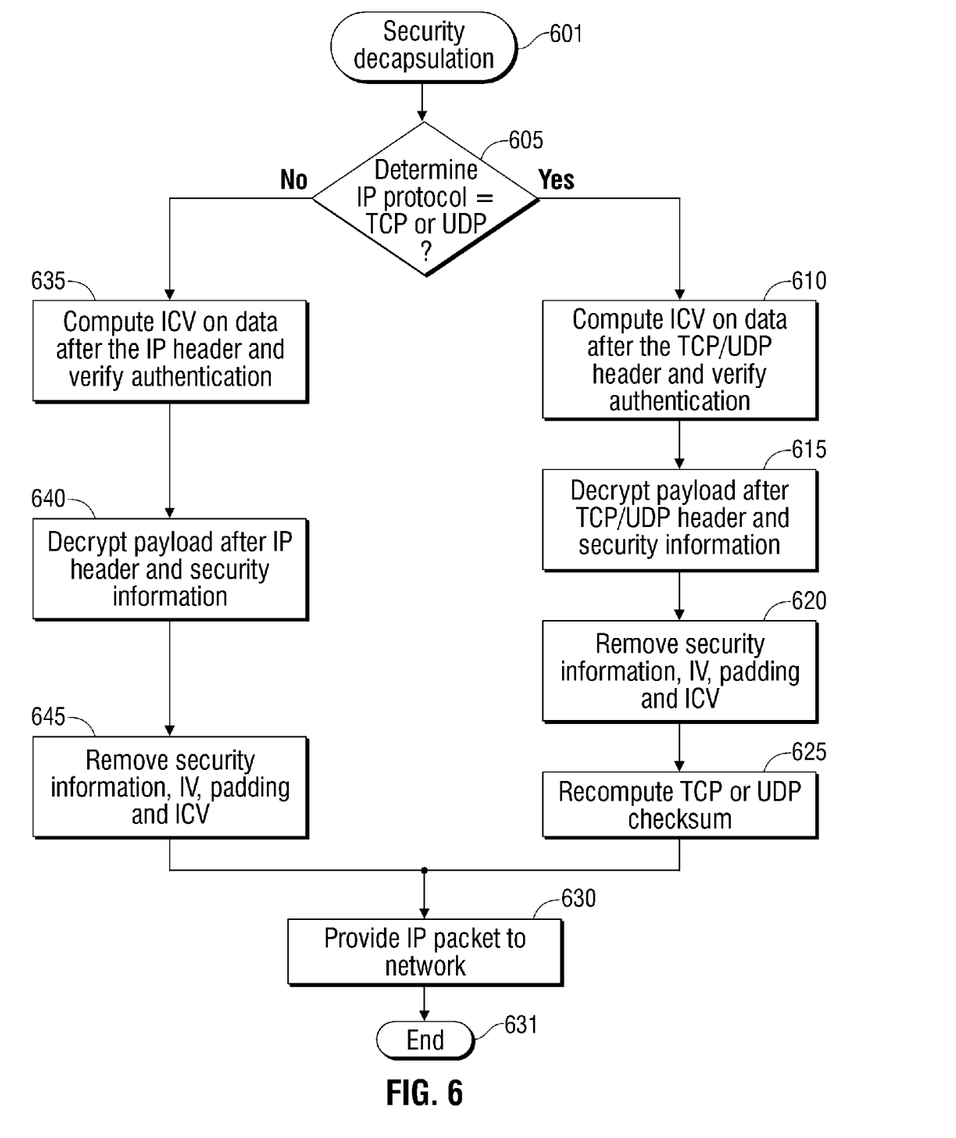
FIG. 6 is a flow chart of an example procedure for security decapsulating a security encapsulated in accordance with an example embodiment of the present invention.

FIG. 6 shows an example procedure 600 for security decapsulating a security encapsulated IP packet like the ones outputted by the procedure 500 of FIG. 5. The procedure 600 starts (601). The procedure 600 determines (605) whether an encrypted payload of the security encapsulated IP packet is an encrypted TCP or UDP payload, or an encrypted IP payload. For example, the procedure 600 uses an IP protocol field in an IP header of the security encapsulated IP packet to make the determination.

If the procedure 600 determines (605) that the encrypted payload is an encrypted TCP or UDP payload, the procedure 600 computes (610) an integrity check value (ICV) from the encrypted payload and security information (e.g., SPI and sequence number) of the security encapsulated IP packet. The procedure 600 then compares the computed ICV with an ICV value appended to the end of the security encapsulated IP packet to verify the integrity of the packet.

The procedure 600 decrypts (615) the encrypted TCP or UDP payload, for example, using the AES algorithm. The result is an unencrypted TCP or UDP payload The procedure 600 removes (620) the security information (e.g., SPI and sequence number), padding, and ICV.

The procedure 600 recomputes (625) a TCP/UDP checksum value for a TCP/UDP header of an IP packet.

The procedure 600 then forms the IP packet having an IP header (with the source and destination IP addresses, and IP protocol field from the security encapsulated IP packet), TCP (or UDP) header (with the recomputed TCP (or UDP) checksum), and the unencrypted TCP (or UDP) payload.

The procedure 600 then provides (630) the IP packet to the network. The procedure 600 ends (631) having security decapsulated the security encapsulated IP packet (with encrypted TCP/UDP payload) and having provided this output IP packet to the network.

Returning to decision block 605, if the procedure 600 determines (605) that the encrypted payload is an encrypted IP payload, the procedure 600 computes (635) an integrity check value (ICV) from the encrypted payload and security information (e.g., SPI and sequence number) from the security encapsulated IP packet. The procedure 600 then compares the computed ICV with an ICV value appended to the end of the security encapsulated IP packet to verify packet integrity.

The procedure 600 decrypts (640) the encrypted IP payload, for example, using the AES algorithm. The result is an unencrypted IP payload.

The procedure 600 removes (645) the security information (e.g., SPI and sequence number), padding, and ICV.

The procedure 600 forms an IP packet having an IP header (with the source and destination IP addresses, and IP protocol field from the security encapsulated IP packet), and the unencrypted IP payload.

The procedure 600 then provides (630) the IP packet to the network. The procedure 600 ends (631) having security decapsulated the security encapsulated IP packet (with encrypted IP payload) and having provided this output IP packet to the network.

When the procedure 500 of FIG. 5 (and to some extent the procedure 400 of FIG. 4) is used to security encapsulate an original IP datagram into a security encapsulated IP packet, the result of using the procedure 600 of FIG. 6 to security decapsulate such a packet is the original IP datagram.

Figure 7:
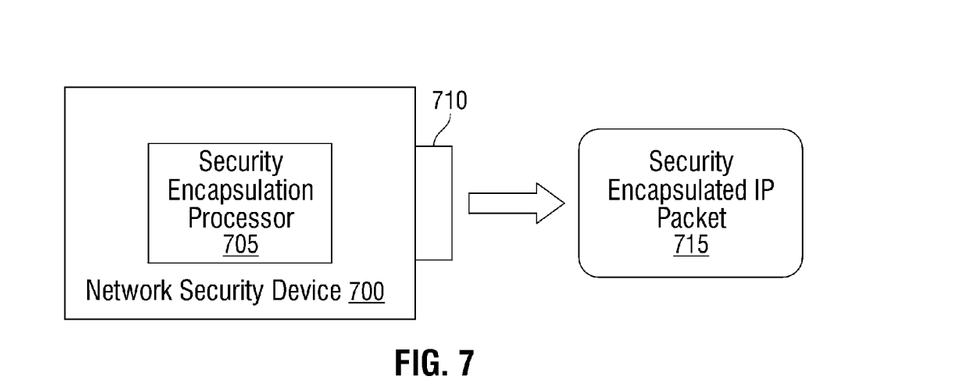
FIG. 7 is a block diagram of an example network security device in accordance with an example embodiment of the present invention.

FIG. 7 shows an example network security device 700 to security encapsulate an original IP datagram (e.g., the IP datagram 106 from Node A 105 of FIG. 1) received from a network (e.g., the network 100 of FIG. 1). The device 700 includes a security encapsulation processor 705, such as the layer-4 security encapsulation processor 300 of FIG. 3, communicatively coupled an interface 710, which, in turn, is communicatively coupled to the network. The security encapsulation processor 705 may be configured to perform the procedure 400 of FIG. 4 or the procedure 500 of FIG. 5 and to security encapsulate the original IP datagram and to provide a security encapsulated IP packet 715 through the interface 710 to the network.

The security encapsulation processor 705 may also be configured to perform the procedure 600 of FIG. 6 to security decapsulate a security encapsulated IP packet and provide an IP datagram.

The network security device 700 of a convenient embodiment (not shown) may also include an interface communicatively coupled to the network to receive and/or transmit IP datagrams. This "non-secure" interface may receive an original IP datagram for security encapsulation (which includes an encrypt process) and transmits an IP datagram for security decapsulation (which includes a decrypt process). The interface may be the same as the interface 710 through which the security encapsulated IP packet 715 is provided to the network or it may be different.

The network security device 700 may be a physical node in the network (like the network security device 110 of FIG. 1) or included as a capability or feature within a network device, such as a router. The device 700 may be part of a physical network node as a component, module, blade or card of that node.

Alternatively, the network security device 700 may be a general purpose computer having a processor, memory, communication interface, etc. (described in greater detail below in reference to FIG. 8). The general purpose computer is transformed into the network security device 700 and its components, for example, by loading instructions into the processor that cause the computer to security encapsulate an original IP datagram received from a network and to provide a security encapsulated IP packet to the network according to the example embodiments described in reference to FIG. 4.

Figure 8:
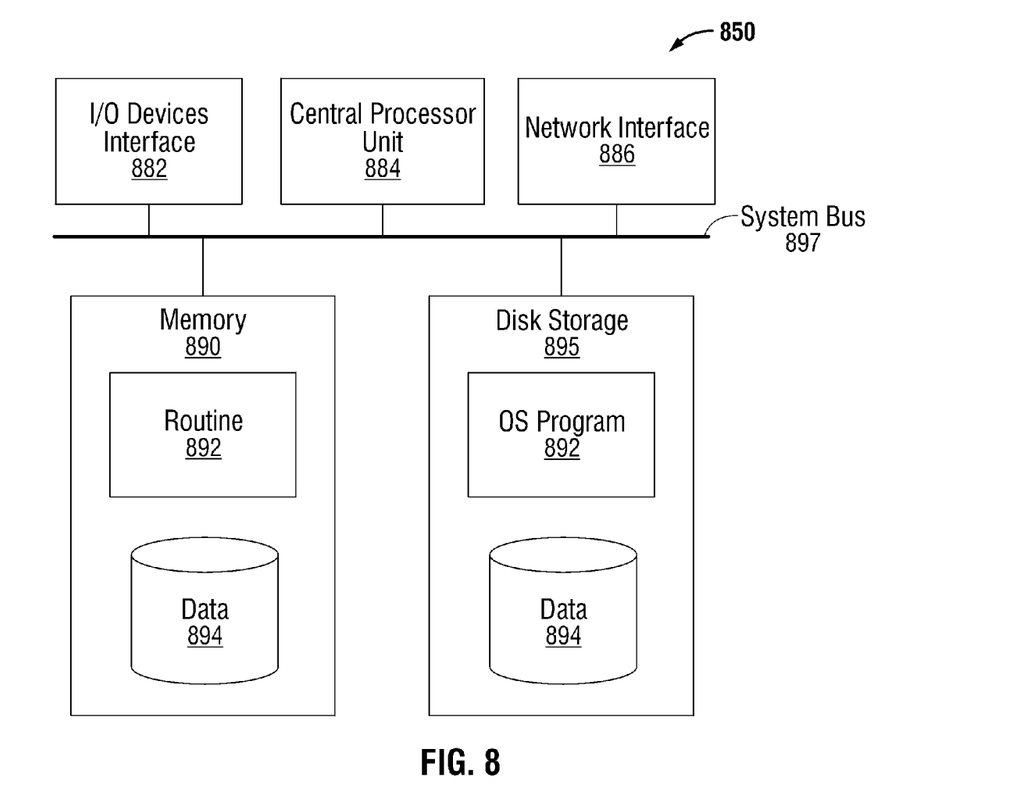
FIG. 8 is an example computer implementing embodiments of the present invention.

FIG. 8 is a block diagram of the internal structure of a computer 850 in which various embodiments of the present invention may be implemented. The computer 850 contains system bus 897, where a bus is a set of hardware lines used for data transfer among the components of a computer or processing system. Bus 897 is essentially a shared conduit that connects different elements of a computer system (e.g., processor, disk storage, memory, input/output ports, network ports, etc.) that enables the transfer of information between the elements. Attached to system bus 897 is I/O device interface 882 for connecting various input and output devices (e.g., keyboard, mouse, displays, printers, speakers, etc.) to the computer 850. Network interface 886 allows the computer 850 to connect to various other devices attached to a network (e.g., in the network 100, Node A 105 and router 115 of FIG. 1). Memory 890 provides volatile storage for computer software instructions 892 (e.g., instructions for the procedure 400 of FIG. 4 for security encapsulating an IP datagram) and data 894 used to implement an embodiment of the present invention. Disk storage 895 provides non-volatile storage for computer software instructions 892 and data 894 used to implement an embodiment of the present invention. Central processor unit 884 is also attached to system bus 897 and provides for the execution of computer instructions.

In one embodiment, the processor routines 892 (e.g., instructions for the procedure 400 of FIG. 4 or for the procedure 500 of FIG. 5 for security encapsulating an IP datagram) and data 894 are a computer program product (generally referenced 892), including a computer readable medium (e.g., a removable storage medium such as one or more DVD-ROM's, CD-ROM's, diskettes, tapes, and other non-transitory forms) that provides at least a portion of the software instructions for the inventive system. Computer program product 892 can be installed by any suitable software installation procedure, as is well known in the art. In another embodiment, at least a portion of the software instructions may also be downloaded over a cable, communication and/or wireless connection.

Further, the present invention may be implemented in a variety of computer architectures. The computer of FIG. 8 is for purposes of illustration and not limitation of the present invention.

Embodiments may be implemented in hardware, firmware, software, or any combination thereof. Embodiments may also be implemented as instructions stored on a non-transient machine-readable medium, which may be read and executed by one or more procedures. A non-transient machine-readable medium may include any mechanism for storing or transmitting information in a form readable by a machine (e.g., a computing device). For example, a non-transient machine-readable medium may include read only memory (ROM); random access memory (RAM); magnetic disk storage media; optical storage media; flash memory devices; and others. Further, firmware, software, routines, or instructions may be described herein as performing certain actions. However, it should be appreciated that such descriptions are merely for convenience and that such actions in fact result from computing devices, processors, controllers, or other devices executing the firmware, software, routines, instructions, etc.

It should be understood that the block, flow, and network diagrams may include more or fewer elements, be arranged differently, or be represented differently. It should be understood that implementation may dictate the block, flow, and network diagrams and the number of block, flow, and network diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method performed by a network security device for security encapsulating an original IP datagram received from a network, the method comprising:
    evaluating an IP payload of the received IP datagram to identify the IP payload as being one of (a) a TCP segment, (b) a UDP datagram or (c) a packet of another type of network;
    encrypting a portion of the IP payload, an initialization vector, and padding to form an encrypted payload;
    forming a security encapsulated IP packet with (i) a non-encrypted IP protocol field from the original IP datagram, and (ii) the encrypted payload, the forming further includes computing a TCP/UDP checksum value for the encrypted payload and replacing an original TCP/UDP checksum value of the TCP segment or UDP datagram with the computed TCP/UDP checksum value; and
    providing the security encapsulated IP packet to the network;
    in the event that the IP payload is identified as a TCP segment or UDP datagram, encrypting the portion of the IP payload includes encrypting a payload of the TCP segment or UDP datagram, the encrypted TCP or UDP payload being the encrypted payload of the security encapsulated IP packet, and passing a header of the TCP segment or UDP datagram without encrypting the header.

2. The method of claim 1 wherein determining the IP payload includes determining whether an IP protocol field within an IP header of the original IP datagram indicates that the IP payload is a TCP segment, UDP datagram or packet of another type of network protocol.

3. The method of claim 1, wherein, in the event of determining that the IP payload is a packet of another network protocol, encrypting the portion of the IP payload includes encrypting the entire IP payload, the encrypted IP payload being the encrypted payload of the security encapsulated IP packet.

4. The method of claim 1 wherein encrypting includes encrypting the portion of the IP payload using Advanced Encryption Standard (AES) encryption.

5. The method of claim 1 wherein encrypting includes computing an initialization vector and encrypting the initialization vector and portion of the IP payload, the encrypted initialization vector and portion of the IP payload being the encrypted payload of the security encapsulated IP packet.

6. The method of claim 1 wherein forming the security encapsulated IP packet includes adding a security parameters index value and sequence number to the packet.

7. The method of claim 1 wherein forming the security encapsulated IP packet includes computing an integrity check value and adding the integrity check value to the packet.

8. The method of claim 7 wherein computing includes computing the integrity check value using Hash-based Message Authentication Code using Security Hash Algorithm 1 (HMAC-SHA-1).

9. A network security device to security encapsulate an original IP datagram received from a network, the device comprising:
    a physical interface to the network;
    a hardware-based security encapsulation processor communicatively coupled to the interface, the security encapsulation processor configured to:
    evaluate an IP payload of the received IP datagram to identify the IP payload as being one of (a) a TCP segment, (b) a UDP datagram or (c) a packet of another type of network protocol;
    encrypt a portion of the IP payload, an initialization vector, and padding to form an encrypted payload;
    provide the security encapsulated IP packet to the network through the interface;
    form a security encapsulated IP packet with non-encrypted IP protocol field from the original IP datagram, and the encrypted payload, and compute a TCP/UDP checksum value for the encrypted payload and replace an original TCP/UDP checksum value of the TCP segment or UDP datagram with the computed TCP/UDP checksum value; and
    in the event that the IP payload is identified as a TCP segment or UDP datagram, encrypt the portion of the IP payload includes encrypting a payload of the TCP segment or UDP datagram, the encrypted TCP or UDP payload being the encrypted payload of the security encapsulated IP packet, and pass a header of the TCP segment or UDP datagram without encrypting the header.

10. The network security device of claim 9 wherein the security encapsulation processor is further configured to determine whether an IP protocol field within an IP header of the original IP datagram indicates that the IP payload is a TCP segment, UDP datagram or packet of another type of network protocol.

11. The network security device of claim 9 wherein, in the event of a determination that the IP payload is a packet of another network protocol, the security encapsulation processor is further configured to encrypt the entire IP payload, the encrypted IP payload being the encrypted payload of the security encapsulated IP packet.

12. The network security device of claim 9 wherein the security encapsulation processor is further configured to encrypt the portion of the IP payload using Advanced Encryption Standard (AES) encryption.

13. The network security device of claim 9 wherein the security encapsulation processor is further configured to:
    compute an initialization vector; and
    encrypt the initialization vector and portion of the IP payload, the encrypted initialization vector and portion of the IP payload being the encrypted payload of the security encapsulated IP packet.

14. The network security device of claim 9 wherein the security encapsulation processor is further configured to add a security parameters index value and sequence number to the security encapsulated IP packet.

15. The network security device of claim 9 wherein the security encapsulation processor is further configured to:
   compute an integrity check value; and
   add the integrity check value to the security encapsulated IP packet.

16. The network security device of claim 15 wherein the security encapsulation processor is further configured to compute the integrity check value using Hash-based Message Authentication Code using Security Hash Algorithm 1 (HMAC-SHA-1).

17. Logic encoded in one or more non-transitory computer readable medium for execution, that when executed, cause an apparatus to:
   evaluate an IP payload of the received IP datagram to identify the IP payload as being one of (a) a TCP segment, (b) a UDP datagram or (c) a packet of another type of network protocol;
   encrypt a portion of the IP payload, an initialization vector, and padding to form an encrypted payload;
   provide the security encapsulated IP packet to the network through the interface;
   form a security encapsulated IP packet with non-encrypted IP protocol field from the original IP datagram, and the encrypted payload, and compute a TCP/UDP checksum value for the encrypted payload and replace an original TCP/UDP checksum value of the TCP segment or UDP datagram with the computed TCP/UDP checksum value; and
   in the event that the IP payload is identified as a TCP segment or UDP datagram, encrypt the portion of the IP payload includes encrypting a payload of the TCP segment or UDP datagram, the encrypted TCP or UDP payload being the encrypted payload of the security encapsulated IP packet, and pass a header of the TCP segment or UDP datagram without encrypting the header.

* * * * *